United States Patent

Adams

[11] Patent Number: 4,856,608
[45] Date of Patent: Aug. 15, 1989

[54] POWER ASSISTED VEHICLE STEERING MECHANISM

[75] Inventor: Frederick J. Adams, Clevedon, Great Britain

[73] Assignee: TRW Cam Gears Limited, Great Britain

[21] Appl. No.: 181,190

[22] Filed: Apr. 13, 1988

[30] Foreign Application Priority Data

Apr. 15, 1987 [GB] United Kingdom ............... 8709112
May 14, 1987 [GB] United Kingdom ............... 8711340

[51] Int. Cl.$^4$ .............................................. B62D 5/06
[52] U.S. Cl. ................................. 180/148; 180/142; 180/79.1
[58] Field of Search ............... 180/141, 142, 147, 148, 180/79.1

[56] References Cited

U.S. PATENT DOCUMENTS

| 4,473,128 | 9/1984 | Nakayama et al. | 180/142 |
| 4,499,964 | 2/1985 | Abe et al. | 180/142 |
| 4,607,717 | 8/1986 | Nakayama | 180/141 |
| 4,627,509 | 12/1986 | Adams et al. | 180/142 |
| 4,651,841 | 3/1987 | Adams | 180/142 |

Primary Examiner—Charles A. Marmor
Assistant Examiner—Donn McGiehan
Attorney, Agent, or Firm—Tarolli, Sundheim & Covell

[57] ABSTRACT

A power assisted vehicle steering mechanism having a rack and pinion assembly, the pinion being mounted to be displaceable by reaction with the rack on the application of steering torque, including a lever mounted for pivotal movement in response to displacement of the pinion, movement of said lever actuating both an hydraulic valve for directing hydraulic fluid to augment steering torque and electrical sensor means for energizing a motor which drives a pump to supply hydraulic fluid to said valve.

2 Claims, 1 Drawing Sheet

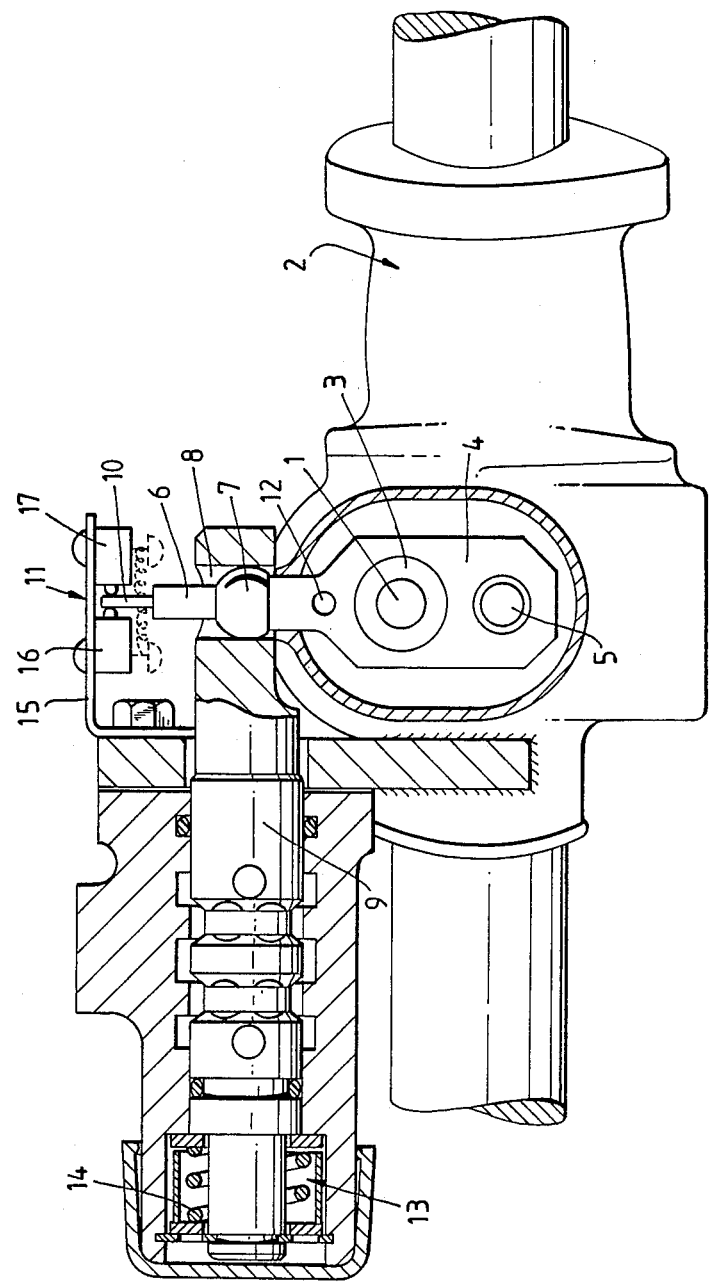

POWER ASSISTED VEHICLE STEERING MECHANISM

INTRODUCTION

This invention relates to a power assisted vehicle steering mechanism having a rack and pinion assembly.

In our prior British Patent Application No. 8709112 filed 15 Apr. 15, 1987 there is disclosed a power assisted vehicle steering mechanism having a rack and pinion assembly, including a pinion shaft adapted at one end to receive a steering wheel, a pinion on the steering shaft engaging a rack connected to effect steering of the vehicle, a bearing for the pinion shaft located between the pinion and said one end, said bearing permitting angular play of the pinion shaft, the pinion shaft having a portion thereof connected to transmit angular movement of the pinion shaft due to steering torque to a power assistance means to augment steering torque.

In one embodiment of the invention disclosed in the description of our above Patent Application, specifically that described with reference to FIG. 6, an electrical sensor means, which actuates a pump, is provided which operates in conjunction with a spool valve, both being actuated by movement of a lever responsive to steering torque. The present invention is based on the realisation that this configuration is advantageous in power assisted vehicle steering mechanisms other than those in which a bearing is provided permitting angular play to the steering shaft.

There are many examples in the prior art of a pivoted lever being used to actuate power assistance means in power assisted rack and pinion vehicle steering mechanisms. Movement of the lever is caused by the reaction of the pinion with the rack when steering torque is applied.

In prior British Patent No. 1111565 (Hydrosteer), a lever 12 is pivoted at 11 and pivotal movement of the lever 12, caused by lateral movement of the pinion 2 on steering torque being applied, will effect actuation of valve assembly 8 through rod 14, the valve assembly causing hydraulic power assistance to by applied to augment the manually applied steering torque.

In prior Japanese Pat. Publication No. 61-171665, a lever 18 (FIG. 3) is moved by the reaction of pinion 1 on rack 2 and this movement of lever 18 causes actuation of an electrical device 20 for the purpose of augmenting steering torque.

OBJECT OF THE INVENTION

It is the main object of this invention to provide a power assisted rack and pinion vehicle steering mechanism of low cost construction.

STATEMENTS OF INVENTION

According to the present invention there is provided a power assisted vehicle steering mechanism having a rack and pinion assembly, the pinion being mounted to be displaceable by reaction with the rack on the application of steering torque, including a lever mounted for pivotal movement in response to displacement of the pinion, movement of said lever actuating both an hydraulic valve for directing hydraulic fluid to augment steering torque and electrical sensor means for energising a motor which drives a pump to supply hydraulic fluid to said valve.

The position of the operating connection of the electrical sensor means may be further away from the pivot point of the lever than the operative connection of the hydraulic valve.

DRAWING

The FIGURE is a part sectional view through a power assistance vehicle steering mechanism according to the invention.

SPECIFIC DESCRIPTION

The mechanism of the invention may be used with any type of conventional rack and pinion steering assembly in which the pinion is mounted so that the reaction of manual steering torque will cause displacement of the pinion.

A pinion shaft 1 enters a housing 2 and is supported by bearings one of which is shown at 3. The pinion shaft 1 is mounted to be displaceable on the application of steering torque. A lever 4, pivoted at 5, is rotated (in the plane of the drawing) by displacement of the pinion shaft 1 either clockwise or counter-clockwise dependent on the direction of steering. The lever 4 has an extension portion 6 with a bulbous portion 7 operating in an aperture 8 at one end of a spool valve 9 and a plate 10 for actuating an electrical sensor means 11. The lever 4 has a hole 12 through which a pin may be inserted into a recess in the casing for setting up the assembly during manufacture.

The spool valve is of conventional construction with a centralising mechanism 13 incorporating a spring 14 to return the valve to its neutral position.

The electrical sensor means 11 is carried by a bracket 15 and comprises electrical micro-switches 16 and 17 alternately operated by movement of plate 10.

The electrical sensor means 11 is connected to an electric motor so that, regardless of which micro-switch is actuated, the motor will be energised. The motor rotates an hydraulic pump for supplying hydraulic fluid to the spool valve 9 for distribution to the power assistance means.

It will be noted that the connection of the electrical sensor means 11 with the lever 4 is further away from the pivot point 5 of lever 4 than is the connection 7, 8 of the lever with the spool valve 9. This feature has the advantage that the movement of the lever, for a given angular rotation thereof, is greater the further from the point of rotation and actuation of the electrical micro-switches can be made so as to cause the electric motor to be energised and rotate the hydraulic pump in advance of any significant movement of the spool valve. This configuration minimises the size of the mechanism and yet gives adequate operating movement.

I claim:

1. An apparatus for use in a vehicle power assisted steering mechanism comprising a pinion shaft rotable in response to a steering torque being applied thereto, a pinion on the pinion shaft, a rack having a meshing engagement with the pinion and displaceable in response to rotation of the pinion to effect steering of the vehicle, a hydraulic motor for providing power assist to vehicle steering, a pump for supplying hydraulic fluid to the hydraulic motor, an electric motor for driving the pump, and a hydraulic valve for controlling fluid flow from the pump to the hydraulic motor, said apparatus comprising:

electric sensor means for actuating the electric motor; and a control lever mounted on the pinion shaft and displaceable about a pivot axis in response to rotation of the pinion shaft, said control lever having a first portion operatively connected with said electric sensor means for actuating the same in response to applying a steering torque to the pinion shaft, and a second portion spaced from said first portion and operatively connected to the hydraulic valve for actuating the same.

2. An apparatus as claimed in claim 1 wherein said first portion is spaced from the pivot axis of said control lever further away than said second portion is spaced from the pivot axis.

* * * * *